M. F. MORGAN.
HORSE HITCH.
APPLICATION FILED SEPT. 27, 1920.
1,378,482.
Patented May 17, 1921.
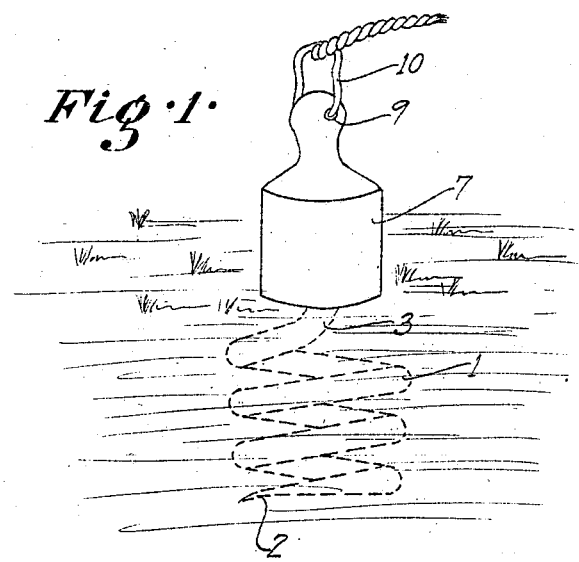
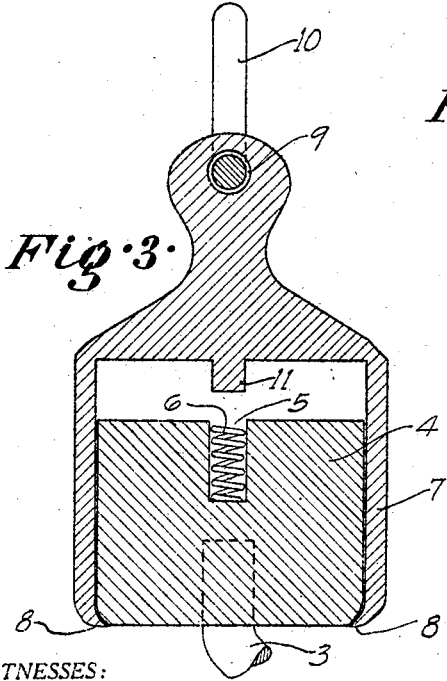
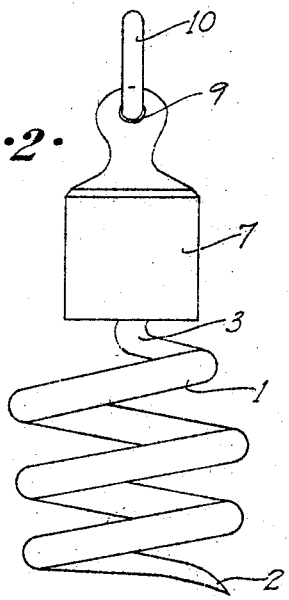
INVENTOR.
M. F. Morgan
BY Adam E. Fisher
ATTORNEYS.

UNITED STATES PATENT OFFICE.

MILLARD F. MORGAN, OF BAILEY, NORTH CAROLINA.

HORSE-HITCH.

1,378,482.   Specification of Letters Patent.   Patented May 17, 1921.

Application filed September 27, 1920. Serial No. 412,963.

*To all whom it may concern:*

Be it known that I, MILLARD F. MORGAN, a citizen of the United States, residing in the city of Bailey and State of North Carolina, have invented new and useful Improvements in Horse-Hitches, of which the following is a specification, reference being had to the accompanying drawings.

This invention is in the nature of a horse hitch or anchor, and the object is to produce a simple, durable and efficient device of this kind as means for securing a horse on the open plain or anywhere where the ordinary and permanent hitching posts or the like are not to be found.

In the drawings:

Figure 1 is a perspective view showing the device in use.

Fig. 2 is an elevation.

Fig. 3 is a vertical, sectional detail of the upper part of the device.

In carrying out the invention in its preferred construction, I provide a worm 1, pointed at its lower end, as shown at 2, to facilitate turning the same into the ground. The upper end is formed into a shank 3 which is rigidly attached to the head 4. A vertical, rectangular recess 5 is formed in the top of the head 4 within which is permanently mounted an expanded coil spring 6. A housing 7 loosely incloses the head 4 and is provided with turned-in flanges at the underside of the head 4 to retain the housing in place upon the head. The housing is inclosed at the top and is provided with the integral, exterior eye 9 through which is mounted the link 10. A rectangular tongue or lug 11 is permanently attached to the upper inner face or roof of the housing 7, being preferably integrally formed therewith, and is adapted to freely engage the recess 5, aforesaid, although the spring 6 operates to normally hold the tongue 11 out of engagement with the recess 5, thus permitting the free rotation of the housing 7. It will be noted that by pressing downwardly upon the upper side of the housing 7 the tongue 11 is forced down into the recess 5 upon and against the spring 6. Normally, the housing 7 is thus adapted for rotative movement upon the head 4, but when the tongue 11 is pressed down into the recess 5, as aforesaid, the housing 7 becomes locked against rotative movement by virtue of the corners of the tongue 11 impinging against the sides of the recess 5. Thus means are afforded for screwing the worm 1 into the ground to serve as an anchor for holding the horse or animal.

In operation, therefore, the worm 1 is so turned into the ground, by pressing the tongue 11 into the recess 5 and then turning the housing 7 which results in turning the worm 1. If desired, a stick may be thrust through the link 10 as an additional leverage. The link 10 also affords means for securing the end of the halter which is attached to the animal.

While I have herein described a certain specific method of constructing and assembling the elements of my invention, it is understood same may be varied in minor details, not departing from the spirit of my invention as defined in the appended claim.

What I claim to be new and patentable is:

A horse hitch comprising a worm adapted to be screwed into the ground to serve as an anchor; a cylindrical head permanently mounted at the top of the worm, said head having a rectangular recess formed in its top side; a housing rotatively mounted over said head, same having its lower edge turned inwardly below the head to form a retaining flange, and having an integral rectangular tongue depending interiorly from the top of the housing adapted to freely engage the recess in the head to lock the housing to the head against rotative movement, and having an exterior integral eye formed at the top of the housing as means for securing the animal thereto; and an expanded coil spring mounted in said recess, and adapted to press said tongue upwardly clear of said recess so as to permit the normal rotative movement of the housing upon the head.

M. F. MORGAN.

Witnesses:
O. L. GLOVER,
J. W. B. FINCH.